April 21, 1964  A. G. MAKOWSKI  3,129,621

CUTTER

Filed March 31, 1959

INVENTOR.
ALEXANDER GEORGE MAKOWSKI
BY
Edward O'Shea
AGENT

April 21, 1964　　　A. G. MAKOWSKI　　　3,129,621
CUTTER
Filed March 31, 1959　　　　　　　　　　2 Sheets-Sheet 2
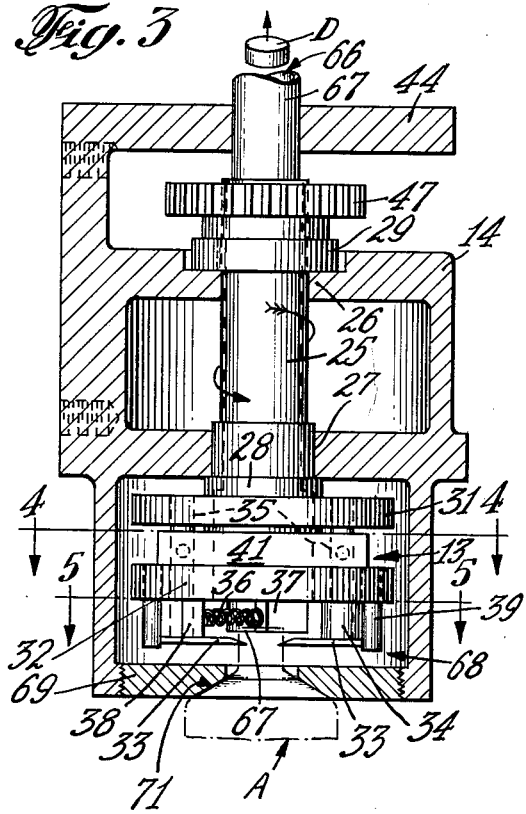
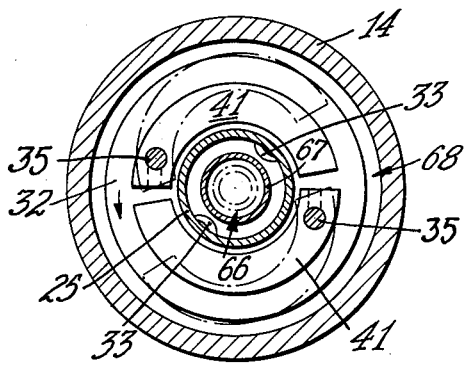
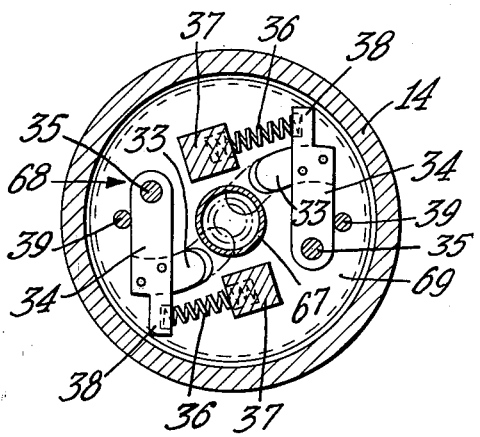
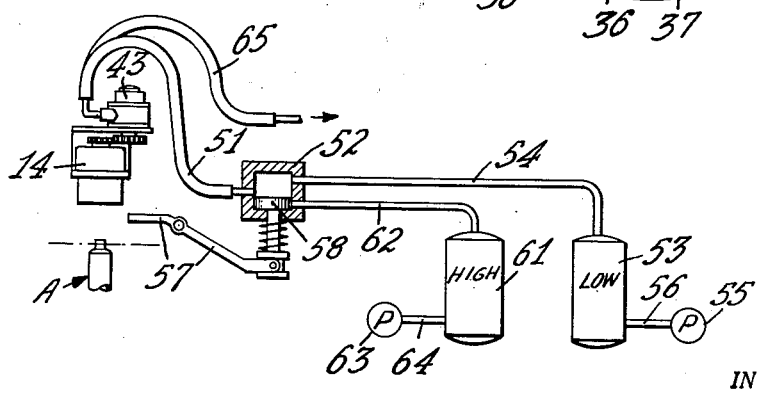
INVENTOR
ALEXANDER GEORGE MAKOWSKI
BY
Edward O'Shea
AGENT

United States Patent Office 3,129,621
Patented Apr. 21, 1964

3,129,621
CUTTER
Alexander George Makowski, Fayville, Mass., assignor to American Can Company, New York, N.Y., a corporation of New Jersey
Filed Mar. 31, 1959, Ser. No. 803,248
5 Claims. (Cl. 82—59)

This invention relates to an article cutter, and has particular reference to a device for cutting or trimming the terminal end of the neck of a molded thermoplastic tube.

In the manufacture of a molded plastic article such as a collapsible tube having a flexible tubular body, an integral shoulder and a neck, the molding operation is usually performed by injecting from the neck end which leaves an extended sprue or core which must be removed before the tube is finally completed. In order to achieve the desired result and also expose the formed dispensing opening in the neck and provide a smooth sealing area at the end of the neck surrounding the opening, trimming or cutting of the excess plastic from the end of the neck is required and it is to the accomplishment of this trimming operation in a rapid and accurate fashion that the present invention is directed.

An object of the present invention is the provision of an article cutter adapted to trim or cut the terminal end from thermoplastic articles.

Another object is the provision in such a device of a cutter head designed to fit over the end of an article and trim or cut the terminal end from molded plastic articles during rotation between the cutter head and the article when either the cutter head or the article is moved towards the other.

Another object is the provision of a rotating cutter head arranged to trim or cut the terminal end from the neck of molded thermoplastic tubes to expose the dispensing opening in the neck and provide a smooth sealing area surrounding the opening at the end of the neck.

A further object is the provision of a rotating cutter head arranged to operate on a nonrotating article or tube in response to the speed of rotation of the cutter head.

Numerous other objects and advantages of the invention will be apparent as it is better understood from the following description, which, taken in connection with the accompanying drawings, discloses a preferred embodiment thereof.

Referring to the drawings:

FIG. 3 is an enlarged section of the cutter head taken substantially along the line 3—3 in FIG. 1;

FIGS. 4 and 5 are sectional views taken substantially along the lines 4—4 and 5—5 of the cutter head shown in FIG. 3, illustrating the cutting knives and their actuating elements with the parts disposed in non-cutting position; and FIG. 6 is a schematic view showing the cutter head, the fluid operating means and suitable connections for rotating the cutter head at different speeds.

As a preferred or exemplary embodiment of the invention the drawings illustrate an article or tube A, having a shoulder B, and a neck C (FIGS. 1 and 2), supported on a mandrel 11 secured to a carrier 12 which may be a stationary element or an intermittently operated turret or conveyor.

Figure 2:
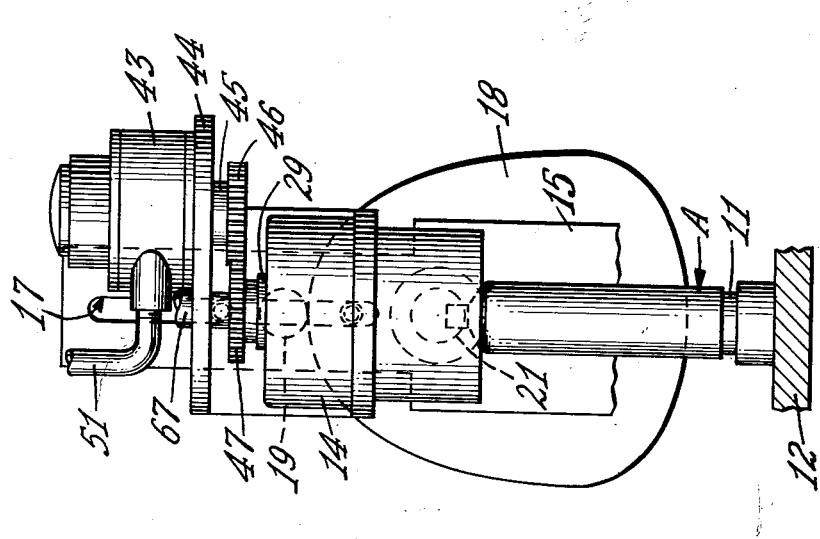
FIG. 2 is a front elevation of the device illustrated in FIG. 1 with the parts shown in a different position.
Figure 1:
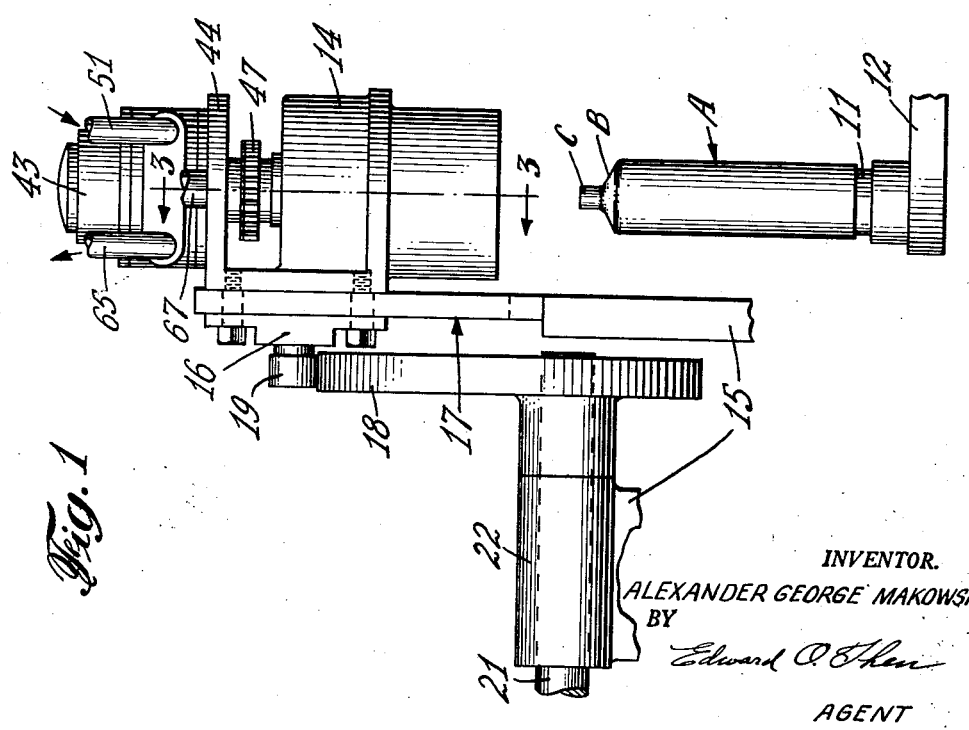
FIG. 1 is a side elevation of a cutting device embodying the instant invention.

A cutter head 13 (FIG. 3) adapted to cut the terminal end of the neck C of a tube A, held in stationary position on the mandrel 11, is rotatably mounted in axial alignment with the mandrel in a cutter head housing 14. This housing preferably is slidably carried so that the cutter head may be moved toward and away from the tube A to bring it into and out of tube trimming position (FIGS. 1 and 2). The cutter head housing 14 slides on a vertical or main frame 15 and is held in place against the frame by a slide plate 16 slidably disposed on the opposite face of the frame and secured to the housing by bolts which extend through a vertical slot 17 in the frame. The cutter head housing is cam actuated for its relative movement and for this purpose a cam 18 coacts with a cam roller 19 which is rotatably carried in the plate 16. The cam 18 is rotatably mounted on a drive shaft 21 which is journaled in a bearing 22 of the main frame 15. Shaft 21 may be operated in any suitable manner.

The cutter head 13 (FIG. 3) comprises a spindle 25 which is rotatably mounted in upper and lower bearings 26, 27 of the carrier head housing 14. Spindle 25 is formed to provide a shoulder 28 which engages against the lower edge of the bearing 27 and is held in rotatable position by a collar 29 secured to the spindle and which is engageable against the upper face of the bearing 26. At the lower end, the spindle 25 is formed with spaced apart upper and lower discs 31, 32 which carry and actuate tube cutting instrumentalities for trimming the tube.

These tube cutting instrumentalities include a pair of oppositely disposed cutting knives 33 (FIGS. 3 and 5) which are secured to arms 34 mounted on the ends of pivot shafts 35 carried in the discs 31, 32. Although the instant invention illustrates a pair of cutting knives, a single knife will also perform a satisfactory trimming operation.

The arms 34 normally are held in a non-cutting position by resilient elements such as springs 36 carried in lugs 37 secured to the lower face of disc 32. These springs bear against arm extensions 38 and hold the arms outwardly against stop pins 39 also secured in the lower face of the disc 32. The cutting knives 33 are actuated from their normal position into tube cutting position by means of weight elements 41 secured to the pivot shafts 35, are preferably disposed intermediate the spaced apart discs 31, 32 and are arcuate in contour to conform to the circular shape of the cutter head (FIGS. 3 and 4).

The weight elements 41 are adapted to swing outwardly from their normal positions as illustrated (FIG. 4) by centrifugal force to a position as illustrated by the dot and dashed lines. This movement of the weight elements is effected by an increase in the speed of rotation of the cutter head from its normal non-trimming rotating speed to that of a predetermined increased speed which is required for a desired tube cutting or trimming operation.

In order to bring about a change in the speed of rotation of the cutter head 13 a fluid actuated motor 43 such as an air or hydraulic type is employed. For the purpose of this invention, the air type motor is preferred and thus used. Such a motor is mounted on a horizontal upper wall 44 of the cutter head housing 14. A motor shaft 45 extending downwardly from the motor carries a drive gear 46 mounted thereon which meshes with and drives a driven gear 47 secured near the upper end of the cutter head spindle (FIGS. 2 and 3).

The motor is operated for rotating the cutter head through a flexible airline connection 51 having one end connected to the motor and its opposite end connected to a control valve 52. Air under low pressure normally is supplied through this valve from a suitable low pressure supply source such as a tank 53 by means of a suitable connection 54, connected at one end to the tank 53 and at the opposite end near the upper end of the valve 52. Air is supplied to the supply tank 53 by means of low pressure pump 55, which is connected thereto by suitable piping 56. Air from the low pressure supply source thus is fed through the valve 52 to the motor 43 for rotating it at its normal non-cutting speed when the cutter head housing 14 is in its raised or upward position as shown in FIG. 1.

Provision also is made for operating the motor 43 at the increased speed of rotation by means of the control valve 52 which is actuated in response to the movement of the cutter head housing 14 during its movement downwardly toward the mandrel 11 and a tube disposed thereon for a trimming operation (FIG. 2). During such a downward movement of the cutter head housing 14, this housing engages against a valve actuating arm 57 (FIG. 6) which is pivotally carried on the main frame 15 in any suitable manner for shifting a spring held valve plunger 58 to close off the low pressure supply of air leading to the valve 52 and at the same time uncover an inlet opening near the lower end of the valve leading to a high pressure supply source such as a high pressure supply tank 61. A suitable pipe connection 62 connects the valve 52 to the tank 61.

Air is supplied to this tank 61 by means of a high pressure air pump 63 which is connected thereto by suitable piping 64 and hence, with the valve 52 open to high pressure air leading from the supply tank 61, it is fed through the connection 51 leading to the motor 43 and rotates it at a relatively high increase in its speed of rotation. It is to be understood that this rotating speed may be regulated in any suitable manner by a change in the air pressure to obtain the desired cutting speed for trimming the terminal ends of the tubes and it is, therefore, this increase in speed of rotation of the cutter head 13 that effects the centrifugally actuated cutter knives 33 to move into cutting position to effect the desired trimming operation.

A flexible connector 65 has one end thereof connected to an air discharge outlet of the motor 43 and the opposite end thereof connected to any suitable pipe connection leading to the outside atmosphere.

In order to eject a core or cut-off element D from the top terminal end of a tube during an end trimming operation, provision is made directly within the cutter head spindle 25 to withdraw these elements by means of suction. For this purpose an internal bore 66 is provided therein which extends longitudinally of the spindle and is connected at its upper end by a tube 67 carried in the wall 44 and leading to a suitable source of vacuum whereby the cut-off element D may be sucked out and discharged to any suitable place of deposit. FIG. 3 of the drawings illustrates the cutting knives 33 in position engaging against the neck of the tube to cut off the trim element D. Such an element also is illustrated as being ejected by the tube 67 at the top broken-off section of the tube.

Provision also is made for closing off the lower end of the housing 14 to provide a housing chamber 68 wherein the cutting head and the cutting instrumentalities operate. This in effect temporarily creates a vacuum chamber within the housing thereby eliminating the possibility of any of the cutoff elements D getting in the way of the operating elements. Closing off of the bottom end of the cutter head housing 14 is effected by a bottom plate 69 being secured in the housing 14. This plate is provided with a central opening 71 having a desired shape to conform with the contour of the shoulder B and thus fits over the upper end of a tube being trimmed.

The trimming of the tube along a predetermined line of cut of the neck C forms a desired sealing surface at the end of the neck and also exposes a discharge opening previously formed in the end of the tube during its molding operation.

Following a tube trimming operation, at which time the cutter head 13 is in the position as shown in FIGS. 2 and 3, the cutter head is returned to its upper position as shown in FIG. 1, at which time the rotation of the cutter head is reduced. This is effected by the movement of the cutter head housing 14 moving away from the actuating arm 57 and thereby returning the valve plunger 58 to its normal position for restoring the low pressure supply of air to the motor 43. It is during this part of the cycle that the trimmed tube A is withdrawn from the mandrel 11 and replaced by another tube for a subsequent tube trimming operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. Apparatus for trimming the end of an article, comprising a support for receiving an article to be severed, a rotatable cutter head, means for moving said cutter head toward said support into trimming relation with said article while received on said support, and actuating means responsive to said moving means and capable of rotating said cutter head first at a normal non-trimming speed and then at an increased speed for a cutting operation.

2. Apparatus of the character defined in claim 1, in which said rotating means is fluid pressure operated means, in which a fluid control valve is provided for regulating the pressure to said fluid pressure operated means and also in which said valve is actuated by movement of said cutter head.

3. Apparatus for trimming the end of an article, comprising a support for receiving an article to be severed, a frame located adjacent said support, a cutter head housing slidably carried on said frame, a spindle rotatably mounted in said housing and having a disc adjacent one end thereof, a shaft passing through said disc and rockably carried thereby, a cutting knife attached to one end of said shaft adjacent one face of said disc and radially swingable movable into and out of article cutting position, means for slidably moving said cutter head housing along said frame, actuating means responsive to said moving means and capable of rotating said spindle and cutting knife first at a normal non-trimming speed and then at an increased speed for a cutting operation, resilient means for retaining said cutting knife in a normal non-cutting position when said spindle is rotated at non-trimming speed, and a weight element carried on the other end of said shaft adjacent the other face of said disc and moving said knife into a cutting position when said spindle is rotated at said increased speed.

4. Apparatus of the character defined in claim 3, in which said means for slidably moving said cutter housing comprises cam operated means, in which said spindle rotating means is fluid operated means, in which a fluid control valve is provided for regulating the pressure to said fluid pressure operating means, in which said valve is actuated by movement of said cutter housing, and in which said housing has connected thereto a source of vacuum for withdrawing cut-off elements from the terminal end of the trimmed article.

5. Apparatus for trimming the end of an article, comprising a support for receiving an article to be severed, a rotatable cutter head, a cutter element swingably mounted on said head normally urged to inactive position, centrifugal means for moving said cutter element to cutting position, means for moving said cutter head relative to said support to carry an article on said support into and out of trimming relation to said cutter head, and actuating means responsive to said moving means and capable of rotating said cutter head first at a normal non-trimming speed just below that sufficient to actuate said cutter element to cutting position and then at an increased speed sufficient for actuating said cutter element to cutting position.

References Cited in the file of this patent

UNITED STATES PATENTS

| | | |
|---|---|---|
| 1,081,687 | McLane | Dec. 16, 1913 |
| 1,570,665 | Dixon | Jan. 26, 1926 |
| 2,276,895 | Voessler et al. | Mar. 17, 1942 |
| 2,368,846 | Klomp | Feb. 6, 1945 |
| 2,488,620 | Evenstad et al. | Nov. 22, 1949 |
| 2,707,028 | Burton | Apr. 26, 1955 |

FOREIGN PATENTS

| | | |
|---|---|---|
| 402,079 | Germany | Sept. 13, 1924 |
| 444,041 | Germany | May 18, 1927 |
| 1,306,588 | France | June 10, 1919 |